United States Patent [19]
Smith

[11] Patent Number: 5,963,880
[45] Date of Patent: Oct. 5, 1999

[54] METHOD FOR PREDICTING WATER METER ACCURACY

[75] Inventor: Jeffrey A. Smith, Montgomery, Ala.

[73] Assignee: Schlumberger Industries, Inc., Norcross, Ga.

[21] Appl. No.: 08/841,148

[22] Filed: Apr. 29, 1997

[51] Int. Cl.$^6$ .................................................. G06F 17/11
[52] U.S. Cl. .................. 702/34; 702/35; 702/45; 702/182; 364/578; 340/870.05
[58] Field of Search ................... 702/34, 35, 12, 702/45–51, 55, 61, 100, 176, 179–184, 187; 364/578, 149–151, 528.16, 528.17, 803; 340/870.02, 870.04, 870.05, 870.16, 606, 605; 377/21; 73/1.34, 1.35

[56] References Cited

U.S. PATENT DOCUMENTS

| | | | |
|---|---|---|---|
| 4,719,587 | 1/1988 | Berte | 702/34 |
| 4,729,236 | 3/1988 | Samborsky | 702/100 |
| 5,602,761 | 2/1997 | Spoerre et al. | 702/179 |
| 5,748,508 | 5/1998 | Baleanu | 702/183 |

OTHER PUBLICATIONS

Schlumberger Accuracy Test, Schlumberger Industries Water Division, (No date).

*Primary Examiner*—Hal Dodge Wachsman
*Attorney, Agent, or Firm*—Dority & Manning, P.A.

[57] ABSTRACT

A method for predicting the accuracy of a water meter includes measuring a plurality of characteristics of each water meter of a plurality of installed water meters, one of the characteristics being water meter accuracy. A regression model is determined that relates water meter accuracy to the one or more other characteristics by performing a linear regression of measurements of the other water meter characteristics against measurements of water meter accuracy.

56 Claims, 2 Drawing Sheets

METHOD FOR PREDICTING WATER METER ACCURACY

BACKGROUND OF THE INVENTION

Presently, there are about 2 million large water meters, meters having a 3 inch or greater inner diameter, in the United States. Generally, large water meters are compound, turbine or fire service meters serving commercial or large residential installations. A compound meter is designed to provide accurate reads through both low and high water flows. These meters are used, for example, in apartment complexes and schools, which alternate between periods of high and low water usage. Turbine meters are designed for high water usage, for example at industrial facilities such as beer breweries. Three manufacturers, Schlumberger, Hersey and Sensus, produce nearly 90% of the large water meters in the United States. A meter's size (3", 6", 10", etc. for large water meters), type (e.g. compound, turbine or fire) and manufacturer (e.g. Schlumberger, Hersey or Sensus) describe the meter model.

Although large water meters represent only approximately 1% to 2% of the total water meter population in the United States, they generate 50% to 60% of municipal water revenues. Unfortunately, however, these meters tend to suffer reduced accuracy over time. In particular, they tend to record less water than was actually used, thereby creating a revenue loss to the municipality. For example, assume a large water meter for a large industrial facility is tested against a calibrated test meter and is found to be 90% accurate. Assume also that the municipality's billing records indicate that the meter was billed $50,000 in the previous year. By dividing $50,000 by 90%, the bill to the industrial facility should have been $55,555.00. Thus, the municipality lost $5,555.00 for a single water meter in a single year.

To avoid excessive meter revenue loss, some municipalities test their meters against calibrated test meters. However, a two man field crew can test only about 4 to 5 large meters per day. In a typical city having 250 to 500 large meters, this procedure is often prohibitively inefficient and expensive. Accordingly, many municipalities simply replace large water meters at a predetermined age (time following installation), for example 15 or 20 years. Thus, the municipality accepts revenue loss rather than undertaking the burden of determining when the loss of water meter accuracy justifies replacement.

SUMMARY OF THE INVENTION

The present invention recognizes and addresses the foregoing disadvantages, and others, of prior art methods.

Accordingly, it is an object of the present invention to provide an improved method for predicting the accuracy of a water meter.

More particularly, it is an object of the present invention to provide a method for predicting the accuracy of a water meter through a regression model relating water meter accuracy to one or more other water meter characteristics.

Some of these objects are achieved by a method for predicting the accuracy of a water meter including the steps of measuring a plurality of characteristics of each water meter of a plurality of installed water meters, one of the characteristics being water meter accuracy, and determining a regression model relating water meter accuracy to the one or more other characteristics by performing a linear regression of measurements of the other water meter characteristics measured at the measuring step against measurements of water meter accuracy measured at the measuring step. In a preferred embodiment, the method includes measuring the one or more other water meter characteristics for at least one water meter and applying these measurements to the regression model to determine the accuracy of the at least one water meter.

Preferably, the regression model relates water meter accuracy to water meter age. Applicant has found that meter age is strongly related to accuracy. Since meter age is typically included in municipality and/or manufacturer records, regression models may be determined where age data is available from water meters which have been accuracy tested by conventional means.

The accompanying drawings, which are incorporated and constitute a part of this specification, illustrate preferred embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
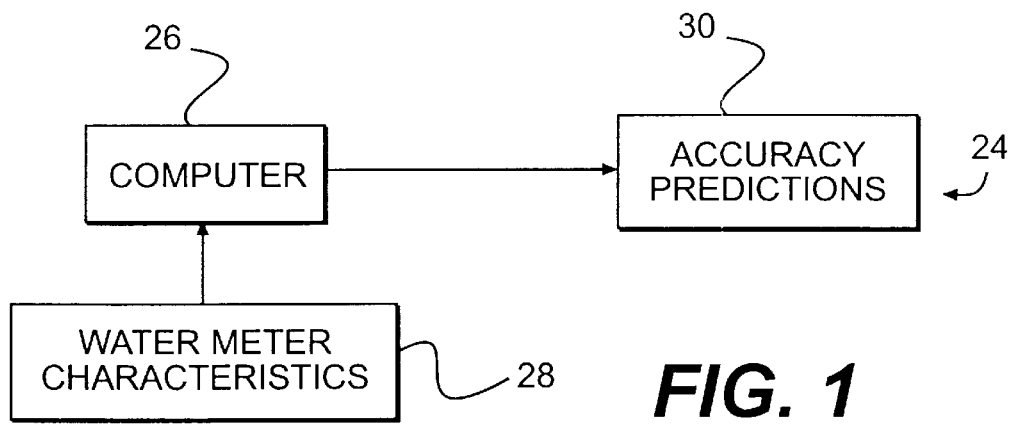
FIG. 1 is a schematic illustration of a system which may be used to perform the method of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used in conjunction with another embodiment to yield a still further embodiment. Thus, it is intended that the present invention covers such modifications and variations as come within the scope of the appended claims and their equivalents.

The present invention is concerned with an improved method for measuring water meter accuracy. As discussed above in the Summary of the Invention, water meter accuracy has been conventionally determined by comparing the operation of a given water meter against a calibrated water meter of the same model under the same operating conditions. Tests are made at five flow rates for turbine service meters, seven flow rates for compound meters and eleven flow rates for fire service meters. These flow rates are industry standards set by the American Water Works Association.

While accurate, this method of water meter testing is generally too inefficient and expensive for routinely monitoring a municipality's entire large water meter population. The method may be used, however, as a data gathering, or measuring, step prior to determining a regression model with which water meter accuracy may be predicted without performing field tests. The meter model may be considered to be "measured" at the field test, along with meter accuracy. Other water meter characteristics, typically measured through municipality records or service records, include water meter maintenance history, water meter usage, water quality and environmental factors. Water meter usage may be determined through meter readings. While total meter read does not represent actual usage for those water meters that have become inaccurate, it can serve as an independent variable in the regression analysis discussed below. Thus, it should be understood that meter read may be considered as meter usage as referred to herein. Water quality may be quantified, for example, by degree of water hardness or chlorinity. Environmental factors might include average temperature and rainfall.

Figure 2:
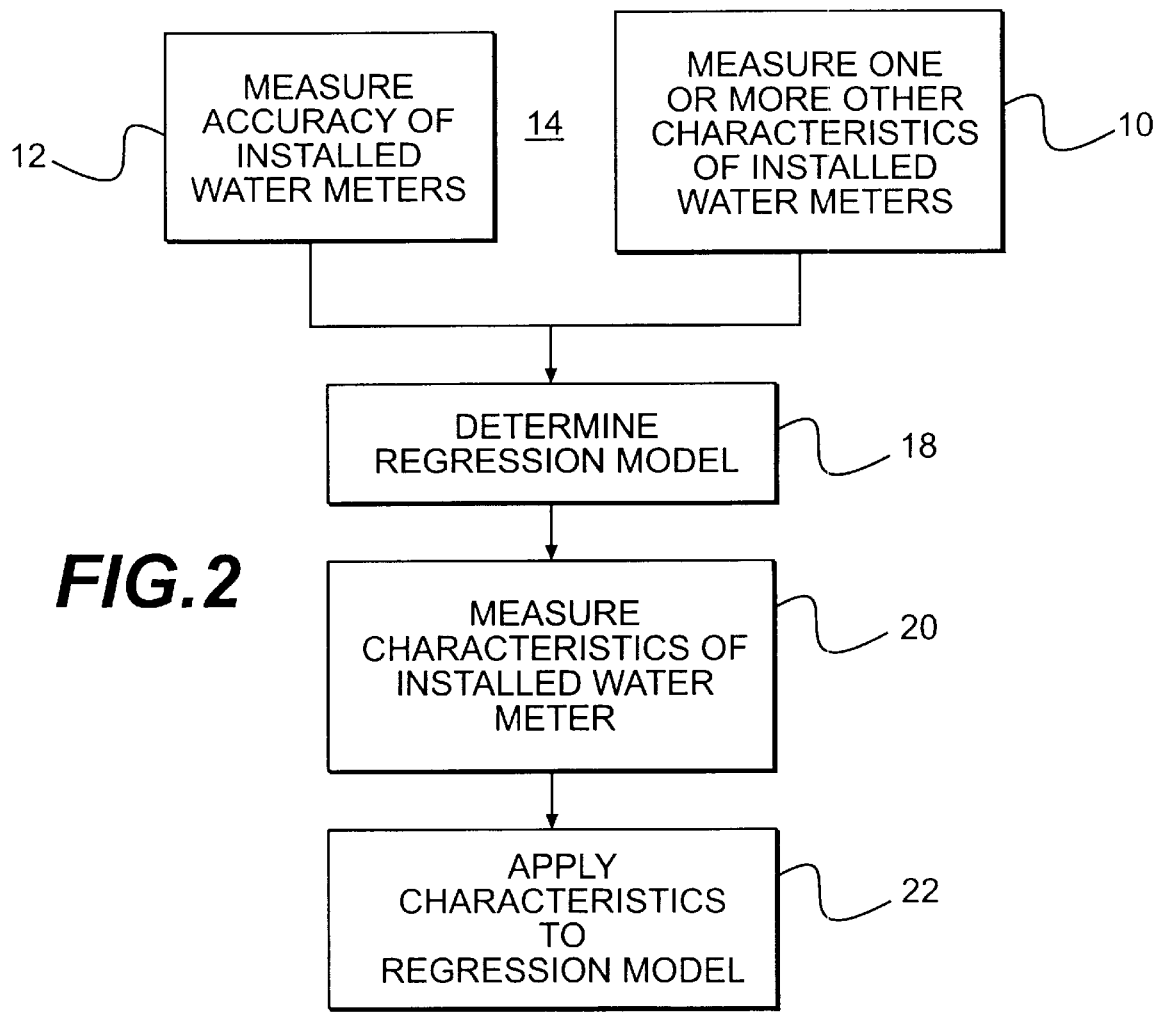
FIG. 2 is a flow chart of a preferred embodiment of the method of the present invention.

Referring to FIG. 2, a measuring step 14 of an accuracy predicting method, indicated generally at 16, includes measurement of one or more of the above described characteristics at 10 and measurement of installed water meter accuracy at 12. The data gathered at measuring step 14 is used to develop a regression model that relates these characteristics to revenue loss. Revenue loss, however, is directly related to water meter accuracy. For example, if j is the price of water per gallon, and k is the number of gallons recorded by a water meter over a certain period of time, and y is the water meter's accuracy in decimal format, then revenue loss R may be determined by:

$$R = (jk/y) - jk.$$

Accordingly, accuracy can be used as a measure of revenue loss to determine whether a meter should be replaced. Unfortunately, as described in the Background of the Invention, conventional methods of measuring water meter accuracy are prohibitively expensive and inefficient. Accordingly, a regression model is determined at 18 to relate the more easily measurable characteristics from step 10 to accuracy so that these characteristics may be used in the future to predict water meter accuracy.

Various water meter characteristics may be used depending, for example, on the availability of data and the consistency of characteristics among the meters being analyzed. Examples of such characteristics include:

Manufacturer
Type
Size
Age
Pipe
Maintenance History
Water Meter Usage
Water Quality
Environmental Factors.

Water meter manufacturer and water meter type may be quantified by assigning numbers to particular manufacturers and to particular water meter types. Although maintenance history, water quality, pipe size and environmental factors are more difficult to quantify, these characteristics are believed to have relatively minimal impact on water meter accuracy.

Maintenance history may have an impact on water meter accuracy but, typically, for limited periods. While accuracy may improve shortly after maintenance, field experience has shown that large water meter accuracy may then deteriorate relatively quickly. Thus, over time, maintenance has a relatively small effect on accuracy. Applicant has also determined that environmental factors, such as weather and placement conditions, and water quality, such as water hardness and chlorinity, do not seriously affect water meter accuracy. This is probably due to construction of water meters and their housings to lessen the effects of such factors. Water meter usage may sometimes be a significant characteristic, although usage data is often unavailable.

Accordingly, in a preferred embodiment, a regression model determined at 18 relates water meter manufacturer, size, type and age to water meter accuracy. The model may include the four independent variables either explicitly, by including each as a * variable in the model, or implicitly, by determining a regression model specific to those water meters having those characteristics. The use of explicit and implicit variables is discussed in more detail below.

By performing a univariate analysis (using STATISTICAL ANALYSIS SOFTWARE, hereinafter referred to as SAS) on data measured from a population of installed water meters, Applicant has determined that water meter accuracy varies in a fairly well defined pattern. By performing a linear regression of the four above-described independent variables against accuracy, a relatively accurate regression model may be obtained. Since regression analysis is a mathematical process which should be well understood by those of ordinary skill in this art, a detailed discussion of the procedure is not provided herein.

The form of the regression model is:

$$y = B_0 + B_1 x_1 + \ldots + B_n x_n + E,$$

Where y is accuracy, $B_n$ are constants determined by linear regression, $x_n$ are the independent variables, n is the number of explicit independent variables, and E is an adjustment factor.

Thus, if all four of the above-described independent variables are explicitly included, the regression model would have the form $$y = B_0 + B_1 x_1 + B_2 x_2 + B_3 x_3 + B_4 x_4 + E,$$

where, for example, $x_1$ is age, $x_2$ is manufacturer, $x_3$ is size, and $x_4$ is type. This assumes that manufacturer and type have been set up as dummy variables with values assigned to the various possibilities for each variable. A multiple linear regression analysis on known values of the dependent and independent variables measured at steps 10 and 12 determine the constants $B_n$. Thereafter, assuming no value for E, manufacturer, size, type and age data for future water meters may be applied to the regression model to determine meter accuracy, y. Preferably, at least 100 measurements are taken at step 14 for accuracy and for each of the independent variables. That is, accuracy, manufacturer, type, size and age should be measured for each of at least 100 meters. Data from multiple measurements of a single meter may be included if the meter is measured at suitable intervals, for example one year.

The "E" variable in the regression model is an adjustment factor to account for water meter characteristics which have relatively minor effects on accuracy. The E value may be particularly useful to account for those characteristics that are not easily quantifiable but which have effects that may be estimated by those having experience in the water meter field. For example, if a regression model is used to predict water meter accuracy throughout the United States, the E value may be used to account for slight effects of water quality variation across the country. For example, water in Florida typically contains a higher degree of sand than water in Maine. Through experience, one knowledgeable about water meters might note that water meters in Florida tend to loose accuracy more quickly than those in areas having better water quality. Thus, a minor negative adjustment may be included as the E value in the regression model when used to predict accuracy of Florida meters. Other water meter characteristics, for example environmental conditions, meter maintenance and water usage, may be addressed through the E factor. The E factor typically adjusts the predicted accuracy by less than about 4% and is preferably used to adjust the accuracy by no more than about 10%.

The E factor is an optional addition to the regression model and may be omitted where the regression model without the E factor provides an acceptably accurate prediction of water meter accuracy. For example, where the installed water meters measured at step 14 and the meters for which the regression model will be used are located in a similar geographic area, for example a single municipality or a geographically similar region of one or more states, the B values in the regression model may account for many of the factors which might otherewise be used in the E value. Thus, for example, if all of the installed water meters measured at step 14 are located in Miami, Florida, an E factor adjustment for water quality should be unnecessary since water quality should be relatively consistent throughout the city. That is, water quality does not vary appreciably from one water meter to the next within Miami, and its effect is likely included in the B constants.

Accordingly, in one preferred embodiment of the present invention, data from a plurality of installed water meters located in a geographic area in which accuracy-affecting water meter characteristics, other than the characteristics measured at step 10, do not substantially vary among the installed water meters is used to determine the regression model at step 18. Such a model may be used to accurately predict water meter accuracy of subsequently measured installed water meters in the same or similar area. For example, Applicant has found that regression models that are determined by water meter model for meters within a similar geographic area and that include age and usage as independent variables may consistently predict accuracy of subsequently measured water meters in the same geographic area to an approximately 85% accuracy.

The accuracy of the regression model may be confirmed by comparing regression model results to water meter accuracy measurements from conventional testing procedures. If the regression model is consistently off in one direction or the other, the E factor may be used to increase the model's accuracy. As indicated above, this may be effective in adjusting a regression model to be used in a specific geographic area. In general, a given water meter model reacts similarly to other meters of the same model in the same geographic area but may react differently in different geographic areas. Thus, for example, an E factor might be needed in a regression model determined for a relatively large area where the model is to be used in a smaller area. Similarly, a regression model determined from water meter data from one geographic area might be applied to water meters outside that area where conditions are relatively similar. A comparison of water meter accuracy predictions using the regression model against water meter accuracy measurements using conventional means may indicate, however, that an appropriate E value should be used in that outside area.

For example, assume that a regression model is determined for a particular water meter model, for example a Schlumberger 6" compound meter, based on measurements of water meter accuracy and age for such meters throughout the United States. When the regression model is applied to Schlumberger 6" compound meters in a particular municipality, however, the accuracy predicted through the regression model differs from conventional testing within a certain range, for example 8%. Furthermore, for example, assume that the water meter accuracy predicted by the regression model for 95% of the water meters tested by conventional means is at least 2% lower than the conventionally tested accuracy. An E factor may be added to the regression model for use with this particular municipality to adjust the regression model accuracy upward by approximately 2%. Thus, the regression model, which was determined for use with water meters throughout the United States, is adjusted to improve its effectiveness within this municipality.

As indicated above, the independent variables may be explicitly or implicitly included in the regression model. Thus, assuming the use of the four independent variables (manufacturer, size, type and age) discussed above, a regression model may be determined having four explicit independent variables. This single regression model may be used to predict the accuracy of any water meter model where age data is available. As noted above, however, this format would require the creation of dummy variables for water meter manufacturer and type. To avoid this, individual regression models may be determined per water meter manufacturer and type. Such models may have the form $$y=B_0+B_1x_1+B_2x_2,$$

where $x_1$ is water meter size and $x_2$ is water meter age. Since the regression model is specific for a particular manufacturer and type, these variables are implicitly included, whereas water meter size and age are explicitly included. The regression model is further condensed if water meter size is also made an implicit variable, so that the model takes the form $$y=B_0+B_1x_1,$$

where $x_1$ is meter age. If such a regression model is determined for each water meter model, a municipality may predict the accuracy of each of its meters by applying the age of each meter to the regression model appropriate for the meter model. While E factors are not illustrated in these regression models, it should be understood that they may be employed as useful or desired in a given application.

It should be understood that various water meter characteristics that affect meter accuracy may be used as explicit independent variables in the linear regression. Thus, the regression model is not limited to the use of the four independent variables described above. For example, water meter usage may be included as an explicit independent variable if suitable data is available from, typically, municipality records. For example, the following regression model was determined for a particular meter model for one California municipality:

$$y=113.11-2.7644x_1-2.009x_2,$$

where y is meter accuracy, $x_1$ is meter age, and $x_2$ is the total volume of water that has registered through the meter. The regression model was determined from a complete census study of all the meters of this particular model in the municipality. Of 148 meters tested, 5 were damaged at the time of the test and were not considered. Additionally, twenty eight meters had been installed for longer than 15 years and were not considered. The remaining 115 meters, for which age and meter usage data were available, were tested for accuracy by conventional means.

This data was then entered into a SAS multiple linear regression function. Accuracy was the dependent variable. Age and usage were the independent variables. The SAS function determined the equation recited above. An E value may be included in this regression model.

Referring again to FIG. 2, once the regression model is determined at 18, subsequent measurements may be taken for installed water meters at 20 and applied to the regression model at 22 to predict the accuracy of those meters. If meter-specific regression models are determined, using age as the independent variable, a municipality need only apply the ages of its large water meters to the appropriate regression models to predict the water meters' accuracies. The revenue loss for each meter may then be estimated as described above, and those meters showing a sufficient revenue loss may be replaced.

Rather than using the regression models to directly determine which water meters will be replaced, the models may be used to determine a subset of water meters which will be tested by conventional means. For example, assume that out of 1000 water meters in a particular municipality, the regression model analysis shows that 200 are inaccurate to a degree that could justify their replacement. The municipality may elect to conventionally test these 200 meters to then make the decision whether the meters should be replaced. Conventional accuracy testing may also be used to confirm the accuracy of the regression model and to determine an appropriate E value, if any such value is needed. Thereafter, the municipality might elect to rely on regression model results without confirmation by conventional testing.

The regression models' accuracy depends upon the data from which they were determined. As discussed above, this data is obtained from accuracy measurements of existing installed water meters. The data is not static, however, and the regression models may change over time. For example, design changes in water meter models may require a complete redetermination of the regression model. Other more subtle conditions, such as changes in meter components, gradual changes in meter usage or water quality, or water pressure changes causing unitized measuring elements in the meters to wear differently, may cause slight changes in the regression models. Accordingly, the regression models should be regularly updated as the data is updated.

Figure 3:
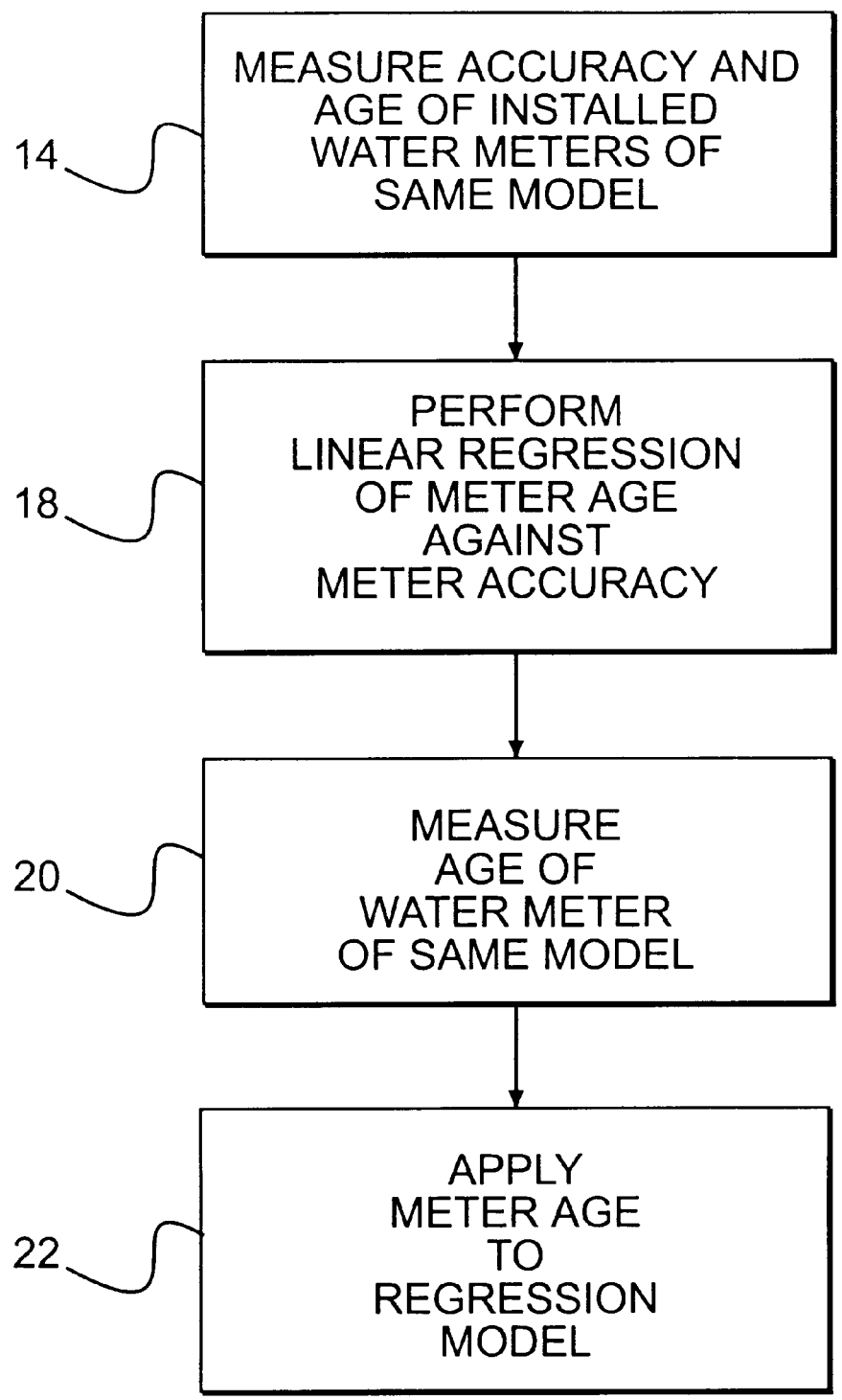
FIG. 3 is a flow chart of the method as in FIG. 2 illustrating the use of particular water meter characteristics.

Referring now to FIG. 3, a preferred embodiment of the method illustrated in FIG. 2 is provided. Accuracy and age of installed water meters of the same model are measured at 14. A linear regression of meter age against meter accuracy is performed at 18 to determine a regression model having age as an explicit independent variable and meter model as an implicit independent variable. Subsequent measurements of water meters of the same model are taken at 20 and applied to the regression model at 22 to predict the accuracy of those water meters.

FIG. 1 illustrates a system for performing the method of the present invention. The system 24 includes a general purpose computer 26, a data input device 28, and an output device 30. General purpose computer 26 may comprise any commonly available general purpose computer including a central processing unit, controller, memory, device drivers and input and output interfaces. Preferably, general purpose computer 26 should have the capability of running the SAS functions described above. However, any computer suitable for obtaining the inputs, performing the calculations, and providing the outputs described above may be utilized according to the invention. Data input device 28 may include any suitable mechanism for providing data to computer 26, for example a keyboard, mouse, scanning device, or communication link from another computer. Separate mechanisms may be used to input data to determine the regression model and to input later data that is to be applied to the regression model. Output device 30 may comprise any commonly available CRT display, printer or inter-computer communications mechanism.

The analysis discussed herein assumes that data is collected only for water meters which have been installed for less than 15 years. There is always the possibility, however, that a meter may have been in use for more than 15 years but at such a low rate of use that its accuracy is not impaired to a degree requiring replacement. Thus, older water meters may be included in the data to determine the regression model where water meter usage is included as an explicit independent variable.

While preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed:

1. A method for predicting the accuracy of a water meter, said method comprising the steps of:

measuring a plurality of characteristics of each water meter of at least a predetermined number of installed water meters, one of said characteristics being water meter accuracy;

determining a regression model relating water meter accuracy to the one or more other of said characteristics by performing a linear regression of measurements of said one or more other water meter characteristics measured at said measuring step against measurements of water meter accuracy measured at said measuring step; and applying measurements of said one or more other water meter characteristics for at least one next water meter to said regression model to thereby predict the accuracy of said at least one next water meter.

2. The method as in claim 1, wherein each said water meter of said installed water meters is of the same size.

3. The method as in claim 1, wherein each said installed water meter is of the same type.

4. The method as in claim 1, wherein each said installed water meter is made by the same manufacturer.

5. The method as in claim 1, wherein each said installed water meter is located in a geographic area in which water meter characteristics, other than said one or more other water meter characteristics measured at said measuring step, which affect water meter accuracy do not substantially vary among said installed water meters.

6. The method as in claim 1, wherein each said installed water meter is of the same model.

7. The method as in claim 1, wherein said one or more other characteristics includes water meter age.

8. The method as in claim 1, wherein said one or more other characteristics includes water meter usage.

9. The method as in claim 1, wherein said one or more other characteristics includes water meter maintenance.

10. The method as in claim 1, wherein said one or more other characteristics includes water quality.

11. The method as in claim 1, wherein said one or more other characteristics includes at least one environmental condition.

12. The method as in claim 1, wherein said one or more other characteristics includes water meter usage and water meter age.

13. The method as in claim 1, wherein said one or more other characteristics includes water meter manufacturer, water meter size, water meter type and water meter age and wherein said regression model includes water meter manufacturer, size and type as implicit independent variables and age as an explicit independent variable.

14. The method as in claim 1, wherein said one or more other characteristics includes water meter manufacturer, water meter size, water meter type and water meter age and wherein said regression model includes water meter manufacturer, size, type and age as explicit independent variables.

15. The method as in claim 1, wherein said determining step includes adjusting said regression model by an independent adjustment factor to account for effects of water meter characteristics other than said one or more other characteristics.

16. method as in claim 15, wherein said independent adjustment factor is less than approximately ten percent of accuracy predicted by said regression model.

17. The method as in claim 1, wherein said regression model is of the form $y=B_0+B_1x_1+ \ldots +B_nx_n+E$, where y represents accuracy, $x_n$ represent said one or more other water meter characteristics, $B_n$ represent constants determined in said determining step, E represents an independent adjustment factor, and n represents the number of said one or more other water meter characteristics explicitly included in said regression model.

18. A method for predicting the accuracy of a water meter, said method comprising the steps of:

measuring a plurality of characteristics of each water meter of at least 75 installed water meters, one of said characteristics being water meter accuracy and wherein said at least 75 installed water meters may include one or more water meters from which each said characteristic is measured once and one or more water meters from which each said characteristic is measured more than once at least one year apart;

determining a regression model relating water meter accuracy to one or more of said characteristics other than water meter accuracy by performing a linear regression of measurements of said one or more other water meter characteristics measured at said measuring step against measurements of water meter accuracy measured at said measuring step; and applying measurements of said one or more other water meter characteristics for at least one next water meter to said regression model to thereby predict the accuracy of said at least one next water meter.

19. A method for predicting the accuracy of a water meter, said method comprising the steps of:

measuring the accuracy and age of each water meter of at least a predetermined number of installed water meters of the same model;

determining a regression model relating water meter accuracy to water meter age by performing a linear regression of measurements of water meter age measured at said measuring step against measurements of water meter accuracy measured at said measuring step; and applying measurements of the age of at least one next water meter to said regression model to thereby predict the accuracy of said at least one next water meter.

20. The method as in claim 19, wherein said determining step includes determining a regression model relating water meter accuracy to water meter age and water meter usage.

21. The method as in claim 19, wherein said regression model is of the form $y=B_0+B_1x_1+E$, where y represents accuracy, $x_1$ represents water meter age, $B_0$, $B_1$ and $B_2$ represent constants determined in said determining step, and E represents an independent adjustment factor.

22. A method for predicting the accuracy of a water meter, said method comprising the steps of:

determining a regression model relating water meter accuracy to one or more other water meter characteristics by performing a linear regression of measurements of said one or more other water meter characteristics made for each water meter of a plurality of installed water meters against measurements of water meter accuracy made for each said water meter of said plurality of said installed water meters;

measuring said one or more other water meter characteristics for at least one water meter; and applying measurements of said one or more other water meter characteristics measured at said measuring step to said regression model to thereby predict the accuracy of said at least one water meter for which said one or more other characteristics are measured at said measuring step.

23. The method as in claim 22, wherein each water meter of said plurality of installed water meters is of the same size and wherein said measuring step includes measuring said one or more other water meter characteristics for at least one water meter of the same size as the water meters of said plurality of installed water meters.

24. The method as in claim 22, wherein each water meter of said plurality of installed water meters is of the same type and wherein said measuring step includes measuring said one or more other water meter characteristics for at least one water meter of the same type as the water meters of said plurality of installed water meters.

25. The method as in claim 22, wherein each water meter of a plurality of installed water meters is made by the same manufacturer and wherein said measuring step includes measuring said one or more other water meter characteristics for at least one water meter of the same manufacturer as the water meters of said plurality of installed water meters.

26. The method as in claim 22, wherein each water meter of said plurality of installed water meters is of the same model and wherein said measuring step includes measuring said one or more other water meter characteristics for at least one water meter of the same model as the water meters of said plurality of installed water meters.

27. The method as in claim 22, wherein each water meter of said plurality of installed water meters are located in a predetermined geographic area in which water meter characteristics, other than said one or more other water meter characteristics, which affect water meter accuracy do not substantially vary among said installed water meters and wherein said measuring step includes measuring said one or more other water meter characteristics for at least one water meter in the same said geographic area as the water meters of said plurality of installed water meters.

28. The method as in claim 22, wherein said one or more other characteristics includes water meter age.

29. The method as in claim 22, wherein said one or more other characteristics includes water meter usage,.

30. The method as in claim 22, wherein said one or more other characteristics includes water meter maintenance.

31. The method as in claim 22, wherein said one or more other characteristics includes water quality.

32. The method as in claim 22, wherein said one or more other characteristics includes at least one environmental condition.

33. The method as in claim 22, wherein said one or more other characteristics includes water meter usage and water meter age.

34. The method as in claim 22, wherein said one or more other characteristics includes water meter manufacturer, water meter size, water meter type and water meter age and wherein said regression model includes water meter manufacturer, size and type as implicit independent variables and age as an explicit independent variable.

35. The method as in claim 22, wherein said one or more other characteristics includes water meter manufacturer, water meter size, water meter type and water meter age and wherein said regression model includes water meter manufacturer, size, type and age as explicit independent variables.

36. The method as in claim 22, wherein said determining step includes adjusting said regression model by an independent adjustment factor to account for effects of water meter characteristics other than said one or more other characteristics.

37. The method as in claim 36, wherein said independent adjustment factor is less than approximately ten percent of accuracy predicted by said regression model.

38. The method as in claim 22, wherein said determining step includes performing a linear regression of at least 75 of said measurements of water meter accuracy against at least 75 of said measurements of said one or more other water meter characteristics.

39. The method as in claim 22, wherein said determining step includes performing a linear regression of at least 90 of said measurements of water meter accuracy against at least 90 said measurements of said one or more other water meter characteristics.

40. The method as in claim 22, wherein said regression model is of the form $y = B_0 + B_1 x_1 + \ldots + B_n x_n + E$, where y represents accuracy, $x_n$ represent said one or more other water meter characteristics, $B_n$ represent constants determined in said determining step, E represents an independent adjustment factor, and n represents the number of said one or more other water meter characteristics explicitly included in said regression model.

41. A method for predicting the accuracy of a water meter, said method comprising the steps of:

determining a regression model relating water meter accuracy to water meter age by performing a linear regression of measurements of water meter age made for each water meter of a plurality of installed water meters of the same model against measurements of water meter accuracy made for each said water meter of said plurality of said installed water meters;

measuring water meter age for at least one water meter of the same model as said plurality of installed water meters; and applying measurements of said water meter age measured at said measuring step to said regression model to thereby predict the accuracy of said at least one water meter for which said water meter age are measured at said measuring step.

42. The method as in claim 41, wherein said regression model is of the form $y = B_0 + B_1 x_1 + E$, where y represents accuracy, $x_1$ represents water meter age, $B_0$, $B_1$ and $B_2$ represent constants determined in said determining step, and E represents an independent adjustment factor.

43. A method for predicting the accuracy of a water meter, said method comprising the steps of:

(a) measuring a plurality of characteristics of each water meter of a plurality of installed water meters, one of said characteristics being water meter accuracy;

(b) determining a regression model relating water meter accuracy to the one or more characteristics measured at step (a) other than water meter accuracy by performing a linear regression of measurements of said one or more other water meter characteristics against measurements of water meter accuracy measured at step (a);

(c) measuring said one or more other water meter characteristics for at least one water meter; and (d) applying measurements of said one or more other water meter characteristics measured at step (c) to said regression model to thereby predict the accuracy of said at least one water meter for which said one or more other characteristics are measured at step (c).

44. A method for predicting the accuracy of a water meter, said method comprising the steps of:

(a) measuring the accuracy and age of each water meter of a plurality of installed water meters of the same model;

(b) determining a regression model relating water meter accuracy to water meter age by performing a linear regression of measurements of water meter age measured at step (a) against measurements of water meter accuracy measured at step (a);

(c) measuring water meter age for at least one water meter of the same model as said plurality of installed water meters; and (d) applying measurements of said water meter age measured at step (c) to said regression model to thereby predict the accuracy of said at least one water meter for which said water meter age is measured at step (c).

45. A method for predicting the accuracy of a water meter, said method comprising the steps of:

measuring one or more water meter characteristics, other than water meter accuracy, for at least one water meter; and applying measurements of said one or more other water meter characteristics measured at said measuring step to a regression model to thereby predict the accuracy of said at least one water meter, said regression model relating water meter accuracy to said one or more other water meter characteristics based on a linear regression of measurements of said one or more other water meter characteristics made for each water meter of at least a predetermined number of installed water meters against measurements of water meter accuracy made for each said water meter of said installed water meters.

46. The method as in claim 45, wherein said one or more other characteristics includes water meter age.

47. The method as in claim 45, wherein said one or more other characteristics includes water meter usage.

48. The method as in claim 45, wherein said one or more other characteristics includes water meter maintenance.

49. The method as in claim 45, wherein said one or more other characteristics includes water quality.

50. The method as in claim 45, wherein said one or more other characteristics includes at least one environmental condition.

51. The method as in claim 45, wherein said one or more other characteristics includes water meter usage and water meter age.

52. The method as in claim 45, wherein said one or more other characteristics includes water meter manufacturer, water meter size, water meter type and water meter age and wherein said regression model includes water meter manufacturer, size and type as implicit independent variables and age as an explicit independent variable.

53. The method as in claim 45, wherein said applying step includes adjusting said regression model by an independent adjustment factor to account for effects of water meter characteristics other than said one or more other characteristics.

54. The method as in claim 53, wherein said independent adjustment factor is less than approximately ten percent of accuracy predicted by said regression model.

55. A method for predicting the accuracy of a water meter, said method comprising the steps of:

measuring one or more water meter characteristics, other than water meter accuracy, for at least one water meter; and applying measurements of said one or more other water meter characteristics measured at said measuring step to a regression model to thereby predict the accuracy of said at least one water meter, said regression model relating water meter accuracy to said one or more other water meter characteristics based on a linear regression of measurements of said one or more other water meter characteristics made for each water meter of at least a predetermined number of installed water meters against measurements of water meter accuracy made for each said water meter of said installed water meters, wherein said one or more other characteristics includes water meter manufacturer, water meter size, water meter type and water meter age and wherein said regression model includes water meter manufacturer, size, type and age as explicit independent variables.

56. A method for estimating revenue loss due to inaccurate water meter, said method comprising the steps of:

determining a regression model relating water meter accuracy to one or more other water meter characteristics by performing a linear regression of measurements of said one or more other water meter characteristics made for each water meter of a plurality of installed water meters against measurements of water meter accuracy made for each said water meter of said plurality of said installed water meters;

measuring said one or more other water meter characteristics for at least one water meter;

applying measurements of said one or more other water meter characteristics measured at said measuring step to said regression model to thereby predict the accuracy of said at least one water meter for which said one or more other characteristics are measured at said measuring step; and adjusting actual water revenue for said at least one water meter over a given time period by said accuracy predicted with said regression model to estimate revenue that would have been brought in for said at least one water meter had said at least one water meter been 100 percent accurate over said time period, the difference between said adjusted revenue and said actual revenue thereby being an estimate of revenue loss for said at least one water meter due to inaccuracy of said at least one water meter.

* * * * *